Dec. 29, 1931.   A. FORICHON   1,839,145
AUTOMATIC GEAR SHIFT
Filed Jan. 4, 1930   4 Sheets-Sheet 4

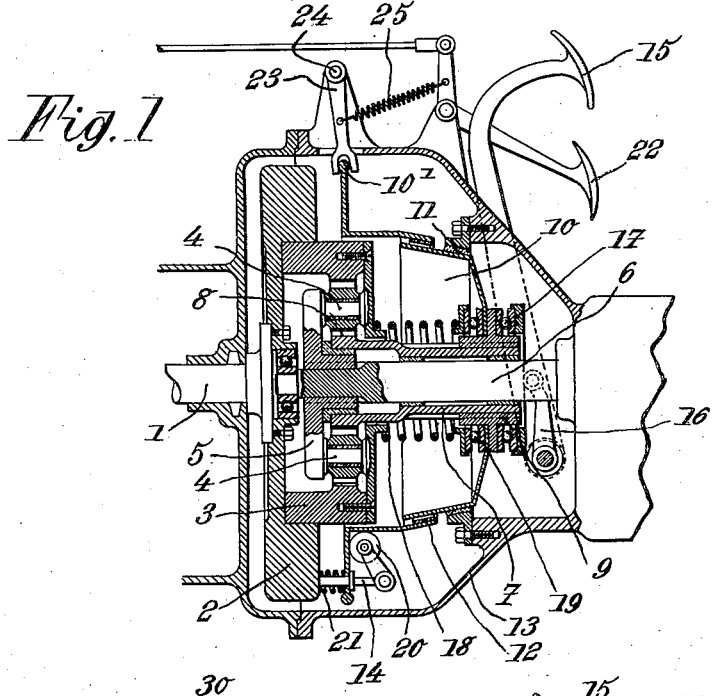
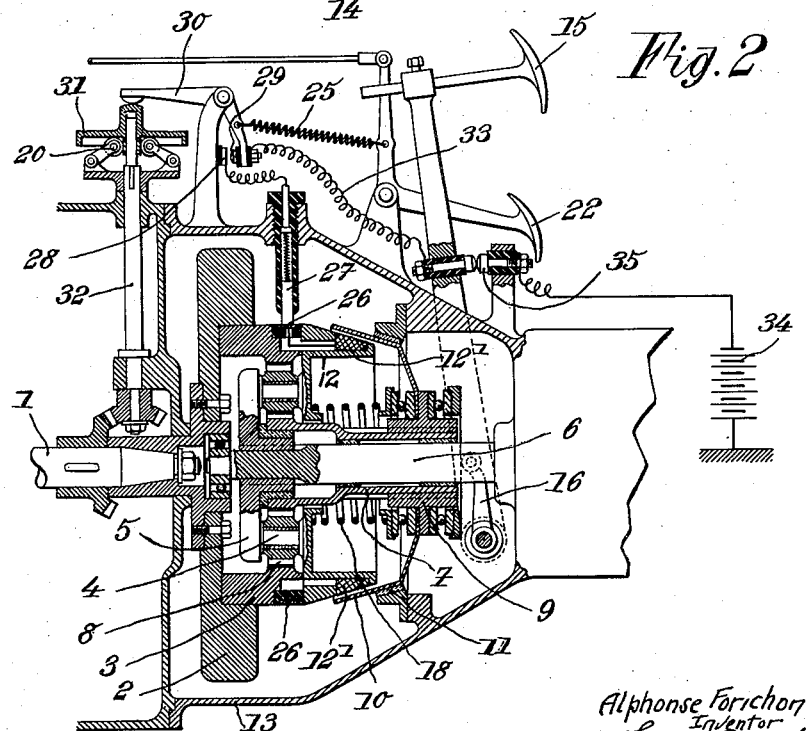

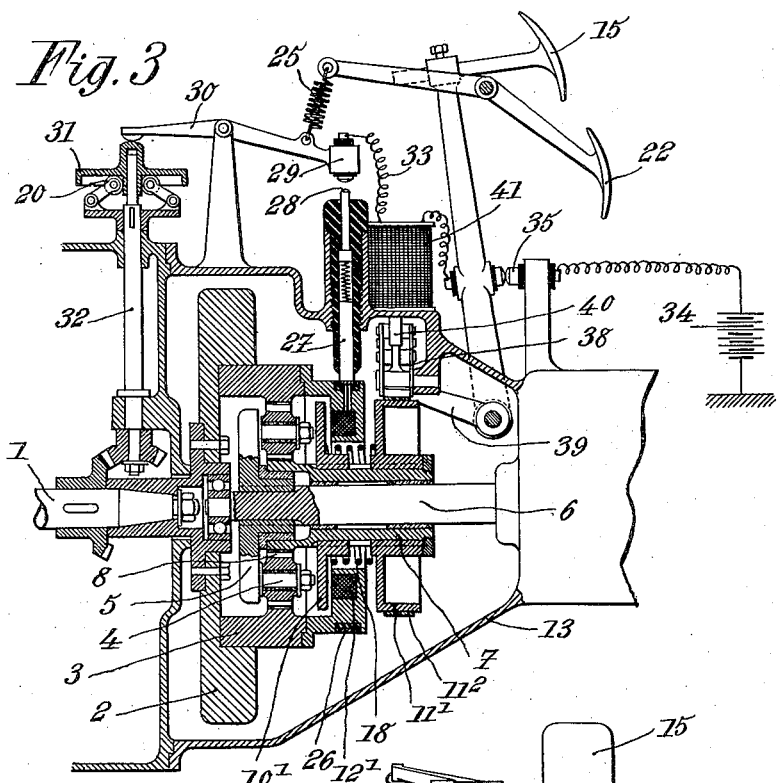
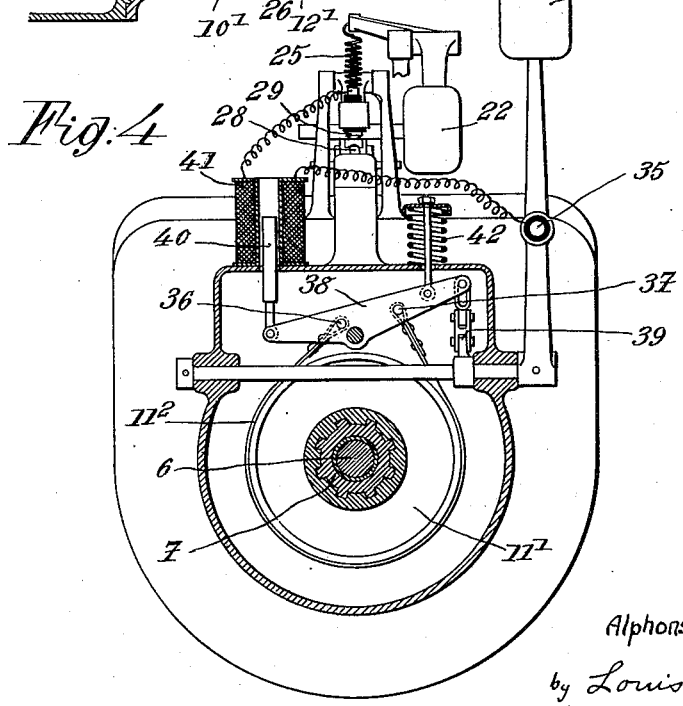

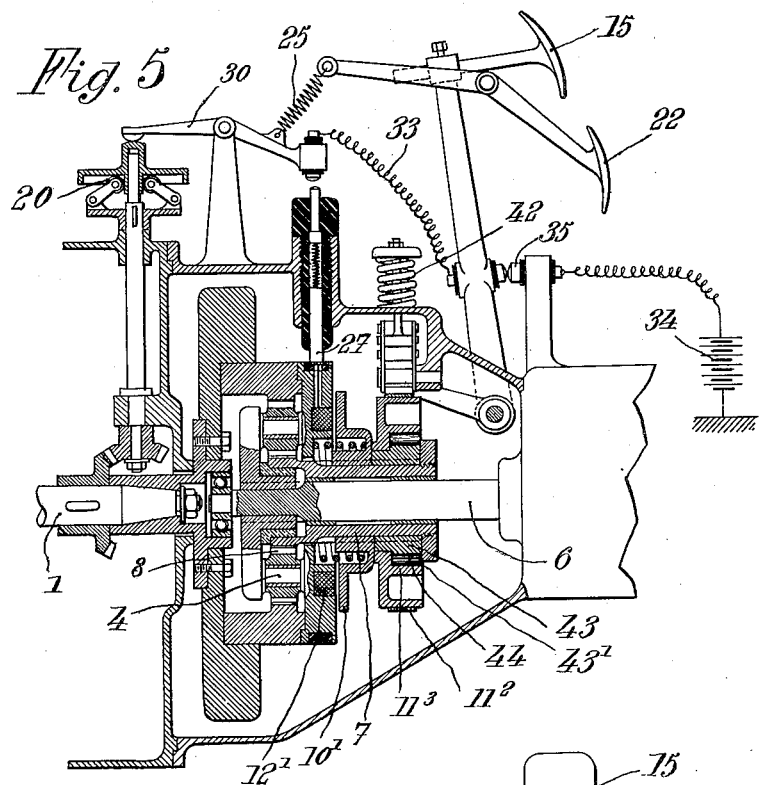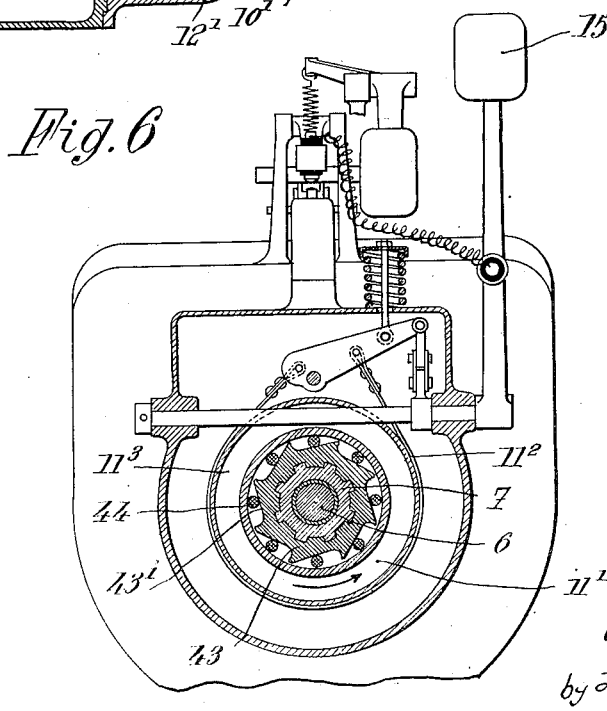

Alphonse Forichon
Inventor
by Louis Barnett
Attorney

Patented Dec. 29, 1931                                                1,839,145

UNITED STATES PATENT OFFICE

ALPHONSE FORICHON, OF PARIS, FRANCE

AUTOMATIC GEAR SHIFT

Application filed January 4, 1930, Serial No. 418,473, and in France January 12, 1929.

The present invention relates to automatic gear-shifts for automobiles, motor driven vessels and the like.

One of the objects of the invention is to provide a gear-shift operating to automatically change gears as increasing vehicle speeds are attained.

Another object is to provide means for modifying the action of the automatic gear-shift in accordance with variations in the load on the motor.

Further objects will appear in the course of the detailed description now to be given with reference to the accompanying drawings, in which:—

Fig. 1 is a longitudinal section through one illustrative embodiment of the invention;

Fig. 2 represents, in longitudinal section, a second possible form;
Fig. 3 illustrates, in longitudinal section, a third constructive embodiment of the invention;

Fig. 4 is an end-view, partially in section, of the structure shown in Fig. 3;
Fig. 5 is a section through a fourth form of the invention;

Fig. 6 is an end-view, partially in section, of the assembly represented in Fig. 5;

Figure 7:
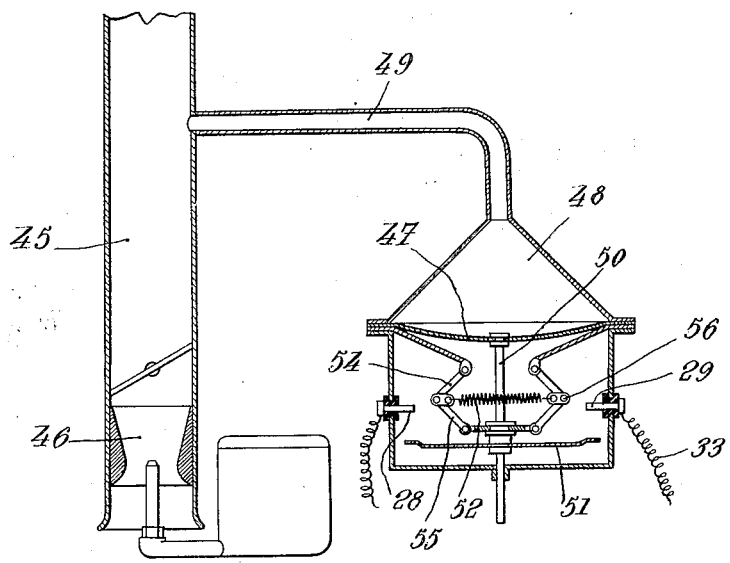
Figs. 7 and 8 show, diagrammatically, a structure capable of replacing certain of the elements in the preceding assemblies at two different stages in its operation.

Referring to Fig. 1 of the drawings there is shown a motor shaft 1, a fly-wheel 2, in internally toothed annulus 3 rigidly attached to the fly-wheel, planetary gears 4 meshing with element 3 and supported on an arm 5 keyed to a driven shaft 6, a tubular element 7 slidable on shaft 6 and having a toothed extremity 8 in meshing relation with gears 4, a collar 9 slidably keyed to element 7 and supporting a truncated conical shell 10, an annular element 11 rigidly attached to the transmission case and having an internal conical surface formed to coact with shell 10, an annular shell 12 having a portion of its internal surface of a conical form adapted to grip shell 10, a plurality of pins 14 rigidly mounted on fly wheel 2 and slidably engaging with orifices formed adjacent the periphery of shell 12, a pedal 15, a forked element 16 engaging with a ball-bearing assembly 17 mounted on collar 9, a spring 18 abutting at opposite extremities against annulus 3 and a ball-bearing assembly 19 mounted on collar 9 whereby shell 10 tends to move into contact with fixed annular element 11, centrifugal masses 20 mounted on the ends of levers pivotally engaging with the free extremities of pins 14, springs 21 opposing the action of masses 20, an accelerator 22 controlling the throttle of the carburettor (not shown), a forked lever 23 engaging with the edge $10^1$ of shell 10 and pivotally supported at 24, and a spring 25 extending from lever 23 to pedal 22.

The operation of the above described assembly is the following:—

Assuming the assembly to be in the position shown in Fig. 1 i. e. with shell 10 in contact with surface 11, element 7 is at rest and the driven shaft turns slowly under the action of planetary gears 4; as the speed of the fly-wheel increases, masses 20 are hurled outwardly and towards the left and displace shell 12 in the latter direction against the resistance of springs 21; when the displacement of shell 12 suffices to bring the latter in contact with shell 10, a combined turning and tractive effect is exerted on the latter which, with a sufficient increase in speed, causes the disengagement of elements 10 and 11; element 7 and shaft 6 then rotate together in direct driven relation to motor shaft 1 and planetary gears 4 to come to rest; when the motor encounters a sufficient resistance to diminish appreciably the speed of shaft 6, masses 20 move from left to right; if the movement of masses 20 continues, shell 12 will move far enough to the right to permit reengagement of elements 10 and 11 and the motor will again operate under slow-speed conditions; the change of speed from direct drive to slow speed and vice versa may thus repeat itself indefinitely without intervention of the operator; the action of masses 20 is modified by variations in load due to the action of pedal 22 which, when depressed, elongates spring 25 and exerts a pull on shell 12 towards the right via lever 23 i. e. opposes engagement in direct drive of elements 10 and 12.

From the foregoing it will be seen that once clutch pedal 15 is released, gear-shifting occurs automatically in accordance with (1) changes of speed of the driven shaft and (2) changes of load on the motor. As soon as clutch 15 is moved downward, fork 16 acts on collar 9 to move shell 10 out of contact with both elements 11 and 12 and power will no longer be transmitted from shaft 1 to shaft 6.

In the form of device shown in Fig. 2, the general assembly remains the same but the means for displacing shell 10 from right to left is electromagnetic instead of frictional. Here, shell 12 is immovable with relation to the fly-wheel and is fitted with a solenoid $12^1$ having one terminal of its winding grounded and the other terminal in conductive relation to a conductive ring 26 mounted on the periphery of annulus 3. A brush 27 contacts with ring 26 and is in series with a fixed contact point 28. One end of a bent lever 30 carries a second contact point 29 and the latter is in series with a wire 33, a contact 35 mounted in the clutch pedal and a source of current 34. The other end of lever 30 bears against reciprocable plate 31 arranged to move up and down under the centrifugal action of pivotally mounted weights 20 connected in rotatable relation to the motor shaft by an auxiliary shaft 32 driven by appropriate gears. From the foregoing, it will be seen that when the speed of masses 20 is sufficient to raise plate 31 to a point where points 28 and 29 contact, current will flow from source 34, via elements 35, 33, 29, 28, 27 and 26 to the solenoid which will exert magnetic attraction on shell 10 so as to disengage the latter from element 11 and establish mechanical contact with annulus 3 (shell 12). The operation of the device is thenceforth similar to the one shown in Fig. 1. To modify the action of masses 20 in accordance with the load, spring 25, connected to accelerator 22, exerts a pull on lever 30 under heavy loads opposing the outward action of said masses. Contact 35 serves to break the solenoid circuit when clutch 15 is depressed.

The structure illustrated in Figs. 3 and 4 is a modification of the one shown in Fig. 2 designed to eliminate the use of conical shell 10. The general assembly remains the same with the following exceptions and differences: fixed annulus 11 is, here, replaced by a rotatable pulley $11^1$ keyed to tube 7, shell 10, by a disc $10^1$ slidably on the same tube, and shell 12 by an annular element integral with annulus 3 and carrying a solenoid $12^1$; spring 18 tends to force elements $10^1$ and $11^1$, and $10^1$ and $12^1$ apart and means are provided for periodically exerting a breaking action on pulley $11^1$ consisting of a brake band $11^2$ attached at points 36, 37 to a pivoted lever 38, a system of levers for lowering one end of lever 38 against the action of a spring 42 when clutch pedal 15 is moved downward, and a solenoid 40 fitted with a plunger 41 adapted to exert a pull on one end of lever 38 when the circuit through solenoids $12^1$ and 41 are closed. Points 36 and 37 are so chosen that when clutch pedal 15 is released, band $11^2$ contacts with pulley $11^1$ with sufficient force to arrest the latter.

As in the case of the apparatus shown in Fig. 2, when masses 20 move outward to lift plate 31, lever 30 closes the circuit at points 28, 29 and current enters solenoid $12^1$ which thereupon attracts plate $10^1$ into contact therewith. However, the closing of the circuit at points 28, 29 also energizes solenoid 41 which is in series with the latter, and plunger 40, moving upward, liberates pulley $11^1$ from band $11^2$. Element 7 is then free to rotate and shafts 6 and 1 will be in direct drive. When clutch pedal 15 is moved downward, the circuit through solenoids 41 and $12^1$ is broken at 35 and lever 38 is lowered so as to disengage elements $11^1$ and $11^2$; shafts 1 and 6 are then no longer in driving and driven relation.

The assembly shown in Figs. 5 and 6 is a modification of the structure shown in Figs. 3 and 4 wherein solenoid 41 and its accessories are eliminated in the following way: Pulley $11^1$, instead of being keyed to element 7 as in Figs. 3 and 4, is replaced by annular element $11^3$ supported on an assembly composed of a toothed wheel 43 having cam shaped surfaces $43^1$ formed thereon of the form shown and cylindrical rollers 44. As soon as pedal 15 is released, band $11^2$ (as before) contacts with element $11^3$ and arrests the latter; but since at the same time element 7 tends to rotate in the direction of the arrow (Fig. 6) under the action of planetary gears 4, rollers 44 move into wedging position between surfaces $43^1$ and the inside of element $11^3$ and element 7 is prevented from rotating. When now, centrifugal masses 20 close the circuit of solenoid $12^1$ to attract disc $10^1$, element 7 is submitted to a turning effect in the opposite direction. Rollers 44 then drop out of wedging position and element 7 is free to rotate with disc $10^1$. When pedal 15 is moved downward, band $11^2$ releases element $11^3$ and shafts 1 and 6 are completely disengaged.

Figure 8:
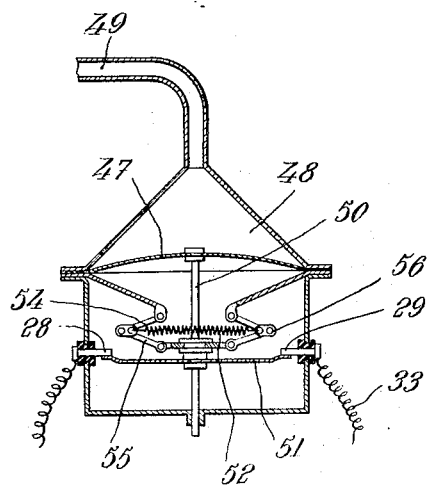

The device represented in Figs. 7 and 8 is intended to replace centrifugal masses 20 and spring 25 in the structures hereinabove described in connection with Figs. 2 to 6, wherein the shift to direct drive is controlled by contact of a pair of points 28 and 29 forming part of a solenoid circuit. Here, a conduit 49 is connected at one end to the suction side 45 of a carburettor 46 and at its other end to a chamber 48 fitted a diaphragm 47. A guided rod 50, depending from the latter, displaces a conducting plate 51 to bridge the space between points 28 and 29 and a system composed of articulated levers 54, 55 and spring 52 oppose upward movement of plate 51. When the depression in 45 is high, membrane 47 moves from the position shown in Fig. 7 to that represented in Fig. 8 against the action of spring 52, closing the circuit between 28, 29 and energizing solenoid 12¹ shown in each of Figs. 2 to 6, centrifugal masses 20 and springs 25 being, of course eliminated. Spring 52 serves, a function analogous to springs 25 in the combinations represented in Figs. 2 to 6.

What I claim is:—

1. In an internal combustion engine, a driving shaft, a driven shaft, means operative to vary the speed of said driving and driven shafts relatively to one another, electromagnetic means controlling the operation of said first named means, and means operative by variations in suction exerted by said engine to control said electromagnetic means.

2. In an internal combustion engine, a driving shaft, a driven shaft, speed-changing means operative to vary the relative speeds of said driving and driven shafts, electro-magnetic means for operating said speed-changing means and including an electrical circuit, and means operative by variations in the operating conditions of the motor to close and open said circuit, said last named means acting on said circuit at different speeds of the engine according as the speed of the latter is increasing or diminishing.

3. In an internal combustion engine, a driving shaft, a driven shaft, speed-changing means to vary the relative speeds of said driving and driven shafts, electro-magnetic means operative to actuate said speed-changing means and including an electrical circuit, and means operative by variations in the suction exerted by said engine to close and open said circuit, said means acting on said circuit at different speeds of the engine according as the speed of the latter is increasing or diminishing.

4. In an internal combustion engine, a driving shaft, a driven shaft, speed-changing means operative to vary the relative speeds of said driving and driven shafts, electromagnetic means controlling the operation of said speed-changing means, and including an electrical circuit, a diaphragm responsive to variations of the suction exerted by said engine, said diaphragm operating to close and open said circuit.

5. In an internal combustion engine, a driving shaft, a driven shaft, speed-changing means operative to vary the relative speeds of said driving and driven shafts, said speed-changing means including a ferrous metal plate mounted on one said shafts and rotatable relatively thereto and electro-magnetic means operative to stop rotation of said plate relatively to said last-named shaft, and means operative by variations in the operating conditions of the engine to actuate said electromagnetic means.

6. In an internal combustion engine, a driving shaft, a driven shaft, speed-changing means operative to vary the relative speed of said driving and driven shafts, means operative by variations in the speed of one of said shafts to actuate said speed-changing means, said means including a lever, an accelerating pedal, and a spring interposed between said accelerating pedal and said lever and operative to exert a pull on the latter when the accelerating pedal is moving into accelerated position.

In testimony whereof I affix my signature.
ALPHONSE FORICHON.